UNITED STATES PATENT OFFICE.

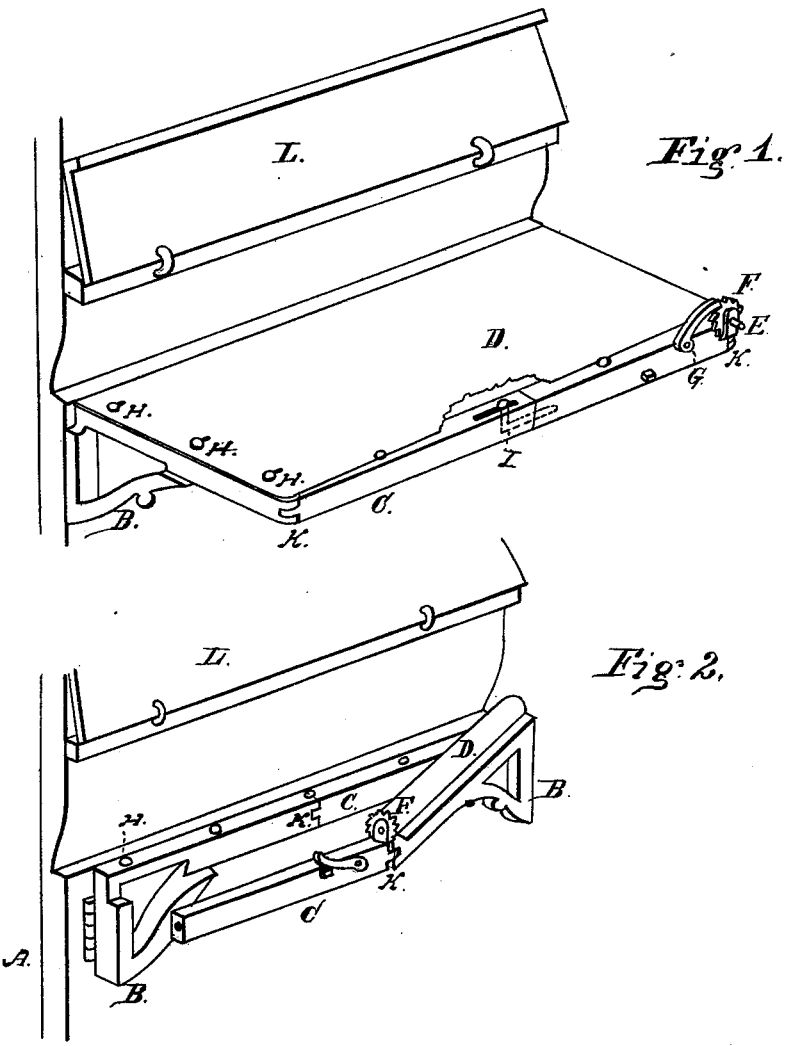

WILLIAM FETTE, OF MILWAUKEE, WISCONSIN.

IMPROVEMENT IN SLEEPING-CAR BERTHS.

Specification forming part of Letters Patent No. 185,903, dated January 2, 1877; application filed November 21, 1876.

*To all whom it may concern:*

Be it known that I, WILLIAM FETTE, of Milwaukee, in the county of Milwaukee, in the State of Wisconsin, have invented certain Improvements in Sleeping-Car Berths, of which the following is a specification:

My invention has for its object the arrangement of a berth in a sleeping-car. It is an upper berth hung to the side of a car by hinges, so as to swing in flat against the side of a car, with a canvas bottom, stretched over it by a roller with a ratchet-wheel and a pawl, which wheel is turned with a crank.

Figure 1 is a view of the berth swung out, with the canvas bottom in place ready for the bed to be made up; and Fig. 2, a view of same partially folded in together, the inner half of the frame back against the side of a car, and the outer half of the frame folded partly back onto the same.

A shows the side of a car, to which the berth is hinged; B B, the hinges with which the frame of the berth is held to the side of a car; C, the frame of the berth; D, a canvas bottom of the berth; E, a roller-shaft, on which is the roller on which the canvas is rolled when the berth is to be swung back out of the way; F, a ratchet on the end of the roller-shaft; G, a pawl, to hold the same from turning back when the roller is turned up; H H H, pins in the frame, over which the end of the canvas is hooked; I, a pin, which holds the center of the frame together when the frame is swung out for use; K K, joints in the frame, so that it can be folded back; L, a lid or cover, which is hung by hinges against the side of a car, above the berth, and falls down over the berth when it is folded up.

This berth is operated as follows: When it is to be opened for use the lid L is raised, as shown, Fig. 1, and the frame of the berth swung out, and pin I inserted in the center joint, as shown in the same figure. The pawl is thrown back, and the canvas unwound from the roller, and the end of the same hooked over the pins H. The pawl is then thrown into gear, and with a crank the roller is rolled up till the canvas is tight enough, and the berth is ready for the bedding. And to fold the berth up again, loosen the pawl from the ratchet, unhook the canvas off of the pins H, and roll it up on the roller. Then take out pin I, and fold the frame-work of the berth back against the side of the car, and drop down lid L, and the berth is out of the way.

I claim as new and as my invention—

1. A sleeping-car berth, constructed with hinges B and frame C, attached to the side of a car, all in combination, substantially as described.

2. Hinges B, frame C, canvas bottom D, roller and ratchet F, pawl G, and pin I, all in combination, substantially as specified.

WILLIAM FETTE.

Witnesses:
J. B. SMITH,
A. H. SCHATTENBERG.